US008659235B2

(12) United States Patent  
Vogler et al.

(10) Patent No.: US 8,659,235 B2  
(45) Date of Patent: Feb. 25, 2014

(54) PROCESS AND CIRCUITRY FOR CONTROLLING A LOAD

(75) Inventors: Gerd Vogler, Kronach (DE); Ingo Simanek, Kueps (DE); Fried Berkenkamp, Allmersbach (DE)

(73) Assignee: Lear Corporation GmbH, Ginsheim-Gustavsburg (DE)

( * ) Notice: Subject to any disclaimer, the term of this patent is extended or adjusted under 35 U.S.C. 154(b) by 936 days.

(21) Appl. No.: 12/717,585

(22) Filed: Mar. 4, 2010

(65) Prior Publication Data

US 2010/0237787 A1 Sep. 23, 2010

(30) Foreign Application Priority Data

Mar. 17, 2009 (DE) .......................... 10 2009 003 632

(51) Int. Cl.  
*H05B 37/02* (2006.01)

(52) U.S. Cl.  
USPC ............................ 315/291; 327/520; 327/581

(58) Field of Classification Search  
USPC .......... 315/291, 299, 300, 302, 309; 327/518, 327/520, 574, 581  
See application file for complete search history.

(56) References Cited

U.S. PATENT DOCUMENTS

| 4,645,948 | A | * | 2/1987 | Morris et al. ................. 327/538 |
| 5,059,890 | A | * | 10/1991 | Yoshikawa et al. ........... 323/315 |
| 5,198,701 | A | | 3/1993 | Davies et al. |
| 5,304,918 | A | * | 4/1994 | Khieu ........................... 323/315 |
| 6,037,832 | A | | 3/2000 | Kaminishi |
| 6,121,763 | A | | 9/2000 | Wilhelm et al. |
| 6,242,870 | B1 | | 6/2001 | Koyanagi et al. |
| 6,807,202 | B1 | | 10/2004 | Plamper et al. |
| 7,262,752 | B2 | | 8/2007 | Weindorf |
| 7,535,735 | B2 | * | 5/2009 | Cuadra et al. .............. 363/21.15 |
| 2002/0030455 | A1 | | 3/2002 | Ghanem |
| 2002/0130786 | A1 | | 9/2002 | Weindorf |
| 2005/0073489 | A1 | | 4/2005 | Suzunaga et al. |
| 2008/0068298 | A1 | | 3/2008 | Shen et al. |

FOREIGN PATENT DOCUMENTS

| DE | 69122844 T2 | 4/1997 |
| DE | 19621749 A1 | 12/1997 |
| DE | 19732828 A1 | 2/1999 |
| DE | 19810827 A1 | 9/1999 |
| DE | 19912463 A1 | 9/2000 |
| DE | 10201053 A1 | 8/2002 |
| DE | 10359196 A1 | 7/2005 |
| DE | 69836940 T2 | 10/2007 |
| DE | 102006033233 A1 | 1/2008 |
| DE | 102007003343 A1 | 3/2008 |
| EP | 1278402 A1 | 1/2003 |
| FR | 2922077 A1 | 4/2009 |

* cited by examiner

*Primary Examiner* — Thuy Vinh Tran  
(74) *Attorney, Agent, or Firm* — Brooks Kushman P.C.

(57) ABSTRACT

A current source and an associated method for supplying current to a load such as an arrangement of LEDs. The intensity of the supplied current varies as a function of the temperature of the load. The intensity of the current is temperature-dependent and limited to a predefined maximum. The temperature dependence is achieved by the component parts that are used without the help of special temperature sensors. The current source is supplied with a reference voltage derived from an integrated circuit. The reference voltage is tapped from a port of the IC and therefore it is switchable. The reference voltage is used to produce a control current, which is fed through a driver stage to produce the current of the current source. Elements in the current source limit the current's intensity and change it as a function of temperature.

20 Claims, 4 Drawing Sheets

PROCESS AND CIRCUITRY FOR CONTROLLING A LOAD

CROSS-REFERENCE TO RELATED APPLICATIONS

This application claims foreign priority benefits under 35 U.S.C. §119(a)-(d) to DE 10 2009 003 632.6, filed Mar. 17, 2009, which is hereby incorporated by reference in its entirety.

BACKGROUND OF THE INVENTION

1. Field of the Invention

The present invention relates to supplying a load, such as an arrangement of one or more light-emitting diodes (LEDs), with a current whose intensity varies as a function of the temperature of the load.

2. Background Art

A current source supplies current to a light-emitting diode (LED) arrangement having one or more LEDs arranged in a chain, an array, etc., for operation of the LED arrangement. Usually, the supplied current is constant. A problem with supplying constant current to a LED is that the current flow through the LED changes as a function of the temperature of the LED. Hence, the brightness of the LED changes as the temperature of the LED changes while the current supplied to the LED is constant. Consequently, current supplied to a LED must vary as a function of the temperature of the LED in order to keep the light emission yield constant. Typically, constant current from a current source is pulse-width modulated to produce the varying current (i.e., pulse-width modulated current) to be supplied to the LED.

The requirements imposed on such a current source deployed in an automotive application for supplying current to a LED arrangement are high. Automotive applications present strong fluctuations in the operating voltage (e.g., between 8 and 18 volts) of the current source. Automotive applications also present an environment having a broad temperature range (e.g., between −40° C. and +120° C.). Additionally, Additionally, high efficiency is required. Thus, highly elaborate and expensive switching regulators are used in conjunction with the current source to produce a current whose intensity varies as a function of the temperature of the LED arrangement.

Economical analog circuits have been used when the difference between the temperature-dependent LED voltage and the operating voltage is small and compromises in the color temperature are acceptable. This is easier with colored LEDs than with white LEDs.

As the temperature of a LED drops, its forward voltage and luminous efficiency rise. The temperature-dependent rise in the forward voltage can be compensated by reducing the current as the temperature decreases, so that this voltage hardly changes, without having to accept a reduction in the luminous efficiency. However, pure voltage stabilization is not sensible to use due to the dispersion of forward voltages among different specimens. Furthermore, predefined characteristic curves are required from one application to another, which range from positive linear, neutral, negative linear, all the way to nonlinear.

DE 197 32 828 C2 describes a current source having a pulse-width modulation switch coupled to an LED arrangement through inductance.

EP 1 278 402 B1 describes a temperature-dependent current source for supplying current to LEDs. A controller controls the current supplied to the LEDs with a set-point input to which a current setting is fed. A set-point generator outputs a current set-point at a set-point output. A thermometer supplies a measured temperature variable that is linearly dependent on the ambient temperature. A subtractor having first and second inputs and an output subtracts an electrical variable at its second input from an electrical variable at its first input and supplies the result at its output. The current set-point is fed to the first input and the output with the set-point input are connected with the controller. A shut-off device with a shut-off input changes the current setting such that the current through the LEDs becomes negligible when a shut-off signal is applied at the shut-off input. A disadvantage is that the controlled variables have to be continuously monitored and the output values have to be adapted as a function of the controlled variables. As such, this solution is relatively elaborate, many components are used, and is cost-intensive.

DE 199 12 463 A1 (corresponding to U.S. Pat. No. 6,807,202) describes a method for stabilizing the optical output power of LEDs. The method compensates for the influence of temperature on the optical output power of LEDs without sensing the temperature or light output of the LEDs. The method is based on knowledge that the current flowing through a LED and the conducting-state voltage drop across the LED are, at constant light output, independent of the temperature, and that this functional correlation can be determined. If this correlation is known, then the current and conducting-state voltage drop must achieve this correlation in operation in order to eliminate the temperature effect on light output. Thus, the combination of LED current and conducting-state voltage is used as a unique measure of the emitted light output and on the basis of this data the conducting-state voltage as a function of the LED current is used. A disadvantage of this method is that the temperature of each LED is held constant using a Peltier element which makes it expensive to implement the arrangement.

DE 198 10 827 A1 describes a temperature-dependent current source for supplying current to a LED. A logic circuit controls the current source as a function of the LED temperature which is continuously monitored. Switching regulators control the current. The LED current is linearly adapted so that the luminous efficiency decreases exponentially. The use of switching regulators is a cost-intensive solution and therefore is unsuitable for mass application.

DE 103 59 196 A1 describes a light emission arrangement for a vehicle illumination system. A LED and a dropping resistor in series are supplied with a supply voltage and a total current. Current flow simulation means are connected in parallel to the LED. A control unit monitors the supply voltage and controls the current flow simulation means such that a minimum total current flows starting from when the voltage falls below a threshold until a minimum supply voltage is reached. The arrangement is not useful from an energy perspective as current reduction is achieved by parallel loads.

DE 10 2006 033 233 A1 describes supplying current to a LED. The temperature of the LED is determined by tapping and evaluating a forward voltage of the LED in an operating state. A disadvantage is that the temperature of the LED must be continuously monitored as the supplied current is varied on the basis of the temperature.

DE 10 2007 003 343 A1 (corresponding to U.S. Publication No. 2008/0068298) describes a process for operating a LED for a constant light output. The process includes: a) set up a direct voltage from a direct voltage source; b) provide a LED circuit to produce a LED current to make the LED emit light, the LED current being controlled; and c) provide a constant voltage and constant current controller to clamp the LED voltage differential and the current, even under adverse conditions such as voltage spikes. A disadvantage is that temperature monitoring is necessary which makes the circuit engineering expensive to implement.

SUMMARY OF THE INVENTION

An object of the present invention is a current source and an associated method for driving a light-emitting diode (LED) arrangement with a specified temperature-dependent current in which the current source is realized with a few standard component parts and achieves different characteristic curves.

A current source in accordance with embodiments of the present invention uses standard component parts having customary tolerances and typical temperature dependencies, without special temperature sensors, by taking a reference voltage, which is for the most part sufficiently stabilized, from a port of an integrated circuit that is present in a control module in a vehicle and making use of it as reference voltage.

This is advantageously accomplished by selecting a port of an integrated circuit as a reference voltage. This makes it unnecessary to stabilize the operating voltage separately or to produce a reference voltage from it, and makes use of the stabilized voltage that was already available in the integrated circuit. The current source's overall temperature behavior can be adjusted using special circuit parts. These circuit parts can produce linear and non-linear characteristic curves of the current source that supplies the current for the load to be driven. The load to be driven may be a light-emitting diode (LED) array having at least two LEDs connected in series or in parallel.

A current source in accordance with embodiments of the present invention makes use of a reference voltage that is supplied by a microcomputer, a microprocessor, or an integrated circuit (collectively referred to as "IC"), through a port belonging to the IC. From this port a transistor is connected as a current source, and it feeds a reference current to a circuit part having another transistor and resistors. The voltage drop across another circuit part and the current determined there serve a driver stage, which drives the current into the connected load as a control signal.

In carrying out the above object and other objects, the present invention provides a method to supply a load with current from a current source. The method includes generating a reference voltage at an integrated chip; tapping by the current source the reference voltage from a port of the integrated chip such that the reference voltage is switchable; generating by the current source a control current as a function of the reference voltage; feeding by the current source the control current to a driver stage of the current source for the current source to produce a supply current to be supplied from an output of the current source to the load; and limiting by the current source the supply current to a pre-defined maximum and changing by the current source the intensity of the supply current as a function of temperature of the load.

In an embodiment, the current intensity is changed through adjustable temperature coefficients of the current source. This makes it possible to establish a characteristic curve for the current intensity curve, which is adapted to the load. This makes it possible to adapt the behavior of the current source as a function of the ambient temperature and the temperature of the load, the adaptation performed automatically by the component parts themselves.

In an embodiment, the adjustable temperature coefficients are achieved through targeted selection of the components of the current source. This makes it possible for each load to have a dedicated characteristic curve for the current curve.

In an embodiment, the current source is formed from a current determining unit, a voltage modification unit, a reference voltage source having the IC, and the driver stage.

In an embodiment, the driver stage is formed from a first transistor, whose collector forms the output of the current source.

In an embodiment, the reference voltage supplied by the reference voltage source is derived from a port of the IC such that the reference voltage is sufficiently stabilized and largely independent of fluctuations in the supply voltage. Moreover, this eliminates the need for elaborate circuit connections to produce a stable reference voltage. It shares the means of voltage stabilization that are present anyway for the IC.

In an embodiment, the current determining unit is formed by a second transistor connected to four resistors. The control current fed to the driver stage is determined from the second transistor into the first resistor between the collector of the second transistor and the supply voltage.

In an embodiment, the control current is allowed to be adjusted with a strongly positive response to temperature by selection of the resistors of the current determining unit.

In an embodiment, the voltage modification unit is formed of three resistors. The choice of the one of the resistors enables to create a response to temperature ranging from positive to neutral all the way to strongly negative.

Further, in carrying out the above object and other objects, the present invention provides a current source with adjustable temperature response to drive a load. The current source includes a reference voltage source, a current determining unit, a voltage modification unit, and a driver stage. The reference voltage source has an integrated chip ("IC") with an output port for outputting a reference voltage. The current determining unit has a second transistor, a fifth resistor, a sixth resistor, a resistor RS, and a resistor RK. The base of the second transistor is connected with the output port of the IC through the fifth resistor for the current determining unit to tap the reference voltage from the output port of the IC. The voltage modification unit has a third transistor, a first resistor, a second resistor, a third resistor, and a fourth resistor. The collector of the third transistor is connected to a supply voltage through the first resistor. The fourth resistor is connected in parallel to the emitter of the third transistor and the first resistor. The emitter of the third transistor is connected to the collector of the second transistor. The driver stage has a first transistor and an emitter resistor. The emitter of the first transistor is connected to the supply voltage through the emitter resistor. The base of the first transistor is connected with the emitter of the third transistor and the second resistor.

In an embodiment, the collector of the first transistor supplies the output current of the current source.

In an embodiment, the second resistor is connected between the collector and the base of the third transistor and the third resistor is connected between the base and the emitter of the third transistor.

In an embodiment, the base of the second transistor is grounded through sixth resistor, and the emitter of the second transistor is grounded through the resistor RS and is connected to the supply voltage through a resistor RK which is connected in series to the resistor RS.

In an embodiment, the temperature coefficient of the current source can be adjusted by a selection of at least one of the first, second, and third resistors and the fifth and sixth resistors.

In an embodiment, a positive temperature coefficient depends upon the fifth and sixth resistors. In an embodiment, a negative temperature coefficient depends upon the second resistor.

In the embodiment, the reference voltage is pulse-width modulated. The modulation frequency is preferably 200 Hz.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
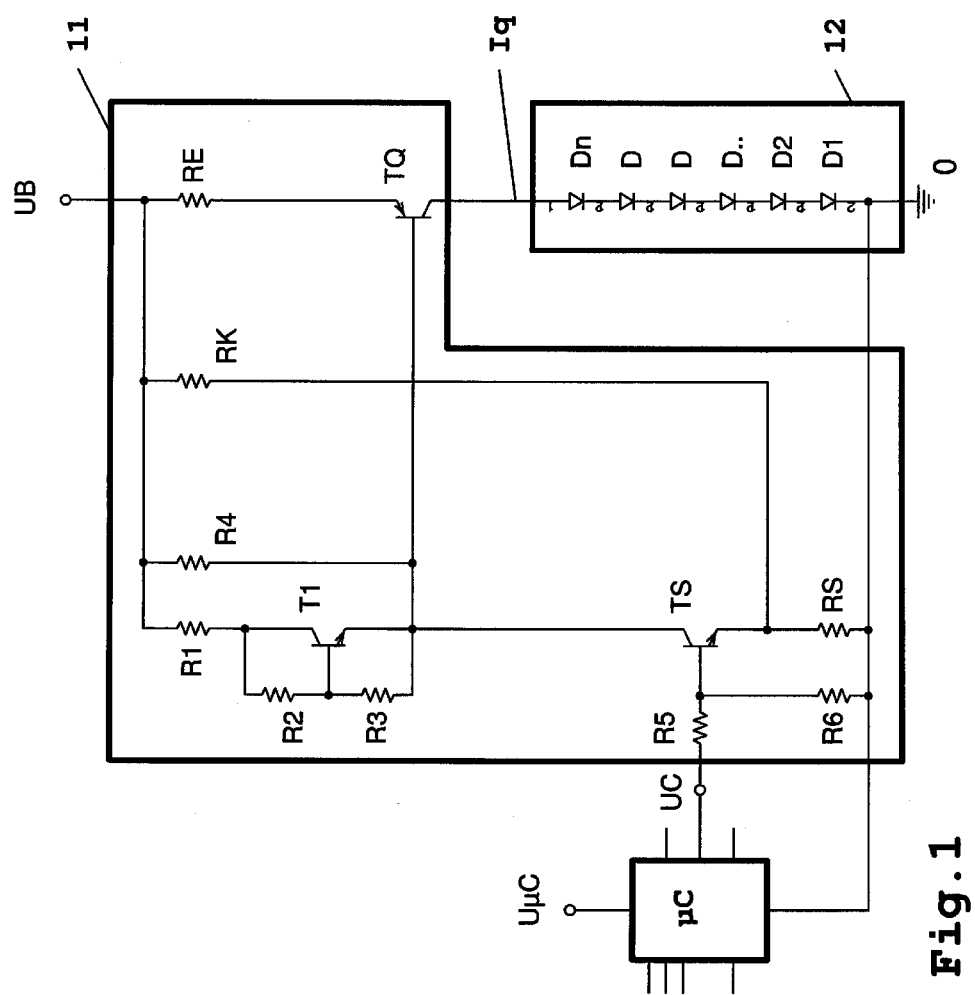
FIG. 1 illustrates a block diagram of a current source in accordance with an embodiment of the present invention.

Referring now to FIG. 1, a block diagram of a current source 11 in accordance with an embodiment of the present invention is shown. Current source 11 includes several component parts which will be discussed below. In general, current source 11 has an input for receiving a supply voltage UB and another input for receiving a reference voltage UC. Current source 11 has an output for supplying a current Iq.

A load 12 is connected to the output of current source 11 to receive current Iq. In this embodiment, load 12 is a light-emitting diode (LED) array having two or more LEDs D1-Dn. Further, in this embodiment, LEDs D1-Dn are connected in series. In another embodiment, LEDs D1-Dn are connected in parallel.

Current source 11 supplies current Iq to load 12. Current Iq is the current which flows through LEDs D1-Dn as LEDs D1-Dn are connected in series. The intensity of current Iq depends on the ambient temperature and the operating temperature of load 12. The intensity of current Iq also depends on the ambient temperature of current source 11. A drop in the temperature (i.e., the operating temperature) of LEDs D1-Dn is accompanied by a rise in their forward voltages and luminous efficiency. As explained in further detail below, the intensity of current Iq is reduced as the temperature of LEDs D1-Dn decreases in order to counter act these affects. As a result, the voltage drop over load 12 hardly has to change without having to accept a reduction in the luminous efficiency.

Changing the intensity of current Iq is achieved by allowing temperature coefficient-dependent adjustment of current source 11. Current source 11 allows adjustment according to both negative linear and positive linear current characteristic curves as a function of the ambient temperature and/or the operating temperature of load 12.

Figure 2:
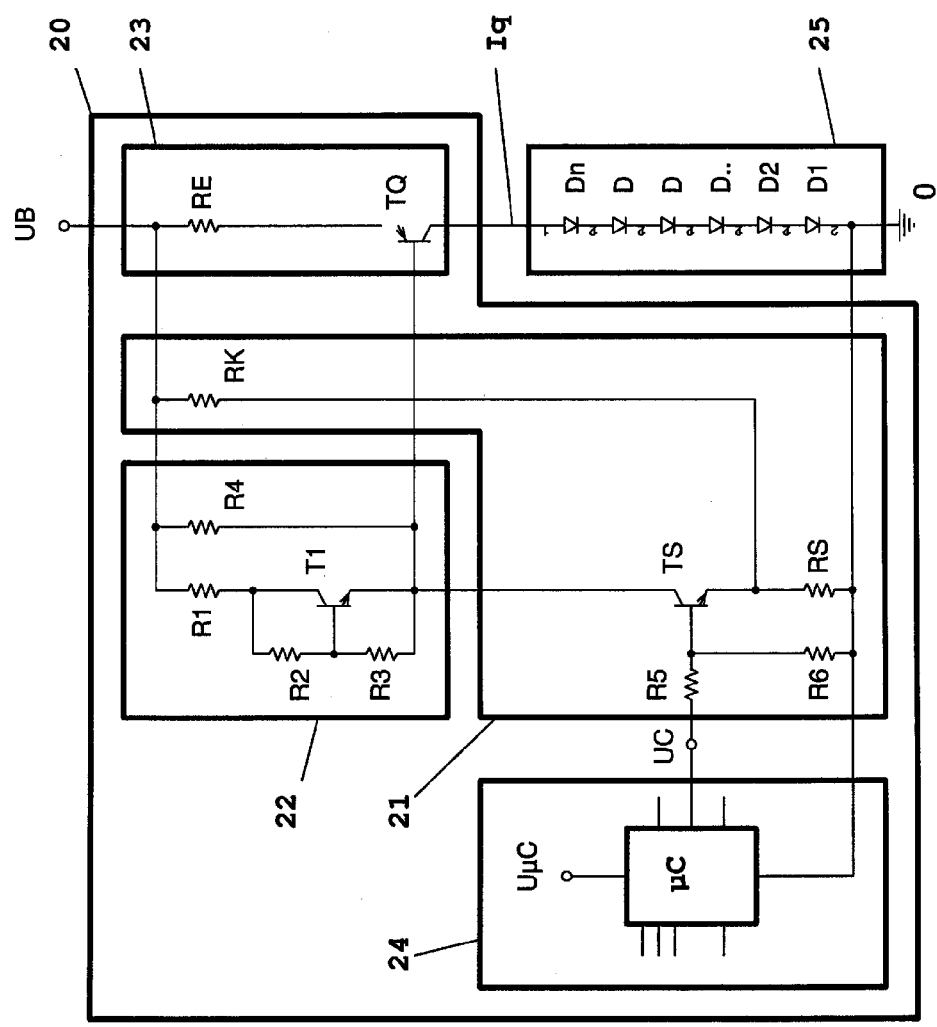
FIG. 2 illustrates a block diagram of a current source in accordance with an embodiment of the present invention.

Referring now to FIG. 2, with continual reference to FIG. 1, another block diagram of a current source 20 in accordance with an embodiment of the present invention is shown. Current source 20 has similar component parts as current source 11 shown in FIG. 1 and like component parts have the same descriptive labels. Current source 20 has an input for receiving supply voltage UB, an input for receiving reference voltage UC, and an output for supplying current Iq. A load 25 is connected to the output of current source 20 to receive current Iq. Load 25 is similar to load 12 shown in FIG. 1 and includes an array of LEDs D1-Dn connected in series.

Current source 20 includes a current determining unit 21, a voltage modification unit 22, a driver stage 23, and a reference voltage source 24. Reference voltage source 24 includes a microcomputer, micro-controller, or integrated circuit μC (collectively referred to as "IC"). Reference voltage source 24 produces reference voltage UC through an output port of the IC. The IC is supplied, in a self-contained manner, by a stabilized means of voltage stabilization and thus its output port supplies almost constant voltage (i.e., reference voltage UC is sufficiently constant). Current sources in accordance with embodiments of the present invention make use of this knowledge and thus do not need elaborate voltage stabilization.

Current determining unit 21 is connected to the output port of the IC of reference voltage source 24 to receive reference voltage UC. As such, reference voltage UC is the input to current determining unit 21. Current determining unit 21 generates a control current based on reference voltage UC. Current determining unit 21 drives, through voltage modification unit 22, the control current which is fed to voltage modification unit 22 of driver stage 23 as a reference voltage. Driver stage 23 then drives current Iq into load 25 as a function of the reference voltage.

The reference voltage is dependent on the ambient temperature and the operating temperature of load 25. Current determining unit 21 and voltage modification unit 22 are able, by a suitably chosen selection of connections, to change the control current as a function of the ambient temperature and/or the operating temperature of load 25. Current determining unit 21 has suitable connections having a strongly positive temperature coefficient and voltage modification unit 22 has suitable connections having a strongly negative temperature coefficient so that interaction makes it possible to form a current intensity curve of current Iq having a defined temperature inflection point.

Figure 3:
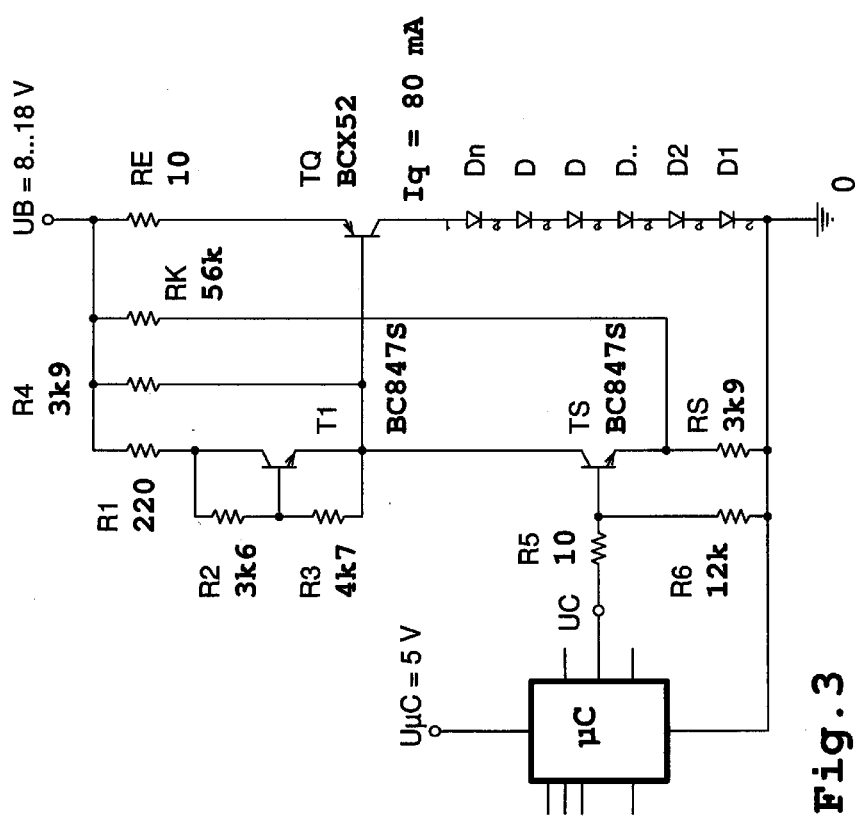
FIG. 3 illustrates the discrete structure of the current sources shown in FIGS. 1 and 2.

Referring now to FIG. 3, with continual reference to FIGS. 1 and 2, the discrete structure of each of current sources 11 and 20 is shown. Reference voltage source 24 includes IC (μC) having the output port for outputting reference voltage UC.

Current determining unit 21 includes a npn-type transistor TS, a fifth resistor R5, a sixth resistor R6, a resistor RS, and a resistor RK. The base of transistor TS is connected through resistor R5 to reference voltage UC at the output port of IC (μC). Resistor R5 is connected in series with resistor R6 which lies between the base of transistor TS and ground. The base of transistor TS is connected between resistors R5 and R6. The emitter of transistor TS is grounded through resistor RS. The emitter of transistor TS is also connected through resistor RK to supply voltage UB. The collector of transistor TS is connected to voltage modification unit 22.

Voltage modification unit 22 includes a npn-type transistor T1, a first resistor R1, a second resistor R2, a third resistor R3, and a fourth resistor R4. Transistor T1 and resistors R1, R2, and R3 are connected together to form a voltage drop unit. In particular, resistor R1 is connected between the collector of transistor T1 and supply voltage UB; resistor R2 is connected between the collector and the base of transistor T1; and resistor R3 is connected between the base and the emitter of transistor T1. Resistor R4 is connected in parallel to the voltage drop unit. The emitter of transistor T1 and the collector of transistor TS of current determining unit 21 are connected to thereby connect voltage modification unit 22 and current determining unit 21.

Driver stage 23 includes a pnp-type transistor TQ and an emitter resistor RE. Emitter resistor RE is connected between supply voltage UB and the emitter of transistor TQ. The base of transistor TQ is connected to the emitter of transistor T1 and resistor R4 of voltage modification unit 22. Load 25 is connected between the collector of transistor TQ and ground to receive current Iq.

Supply voltage UB can fluctuate between 8-18 volts. These fluctuations cause a change in the power dissipation of transistor TQ and thereby cause an error in current Iq. In current determining unit 21, through resistor RK, a compensation current is driven into resistor RS as a function of supply voltage UB to balance the error in current Iq caused by the supply voltage UB fluctuations.

Operation of each current source 11 and 20 is as follows. Transistor TS of current determining unit 21 produces a control current corresponding to reference voltage UC. The control current is produced for transistor TQ of driver stage 23 which functions as a driver.

Transistor TS applies the control current to resistor R4 of driver modification unit 21. The control current from transistor TS produces a voltage drop at resistor R4. R4 is connected in parallel with transistor T1 and resistor R1 of driver modification unit 21. Transistor T1, together with resistors R2 and R3, forms a Zener diode over its collector-emitter section. The temperature coefficient of this Zener diode is adjustable through resistors R2 and R3. It is advantageous for the temperature coefficient there to be strongly negative. It is counteracted by transistor TS which has a positive temperature coefficient.

If the ambient temperature and/or the operating temperature of LEDs D1-Dn rises, then the voltage through the collector and emitter of transistor T1 decreases. If this voltage becomes smaller than the voltage drop across resistor R4, then resistor R1 is connected in parallel to resistor R4 and limits the voltage rise. This limits the applied current in resistor R4, which is converted into current Iq through transistor TQ of driver stage 23. If the ambient temperature and/or the operating temperature of LEDs D1-Dn falls, then the voltage through transistor T1 rises again (through its collector/emitter section), until resistor R1 becomes ineffective compared with resistor R4. Starting at this point in time, the strongly positive response to temperature (temperature coefficient) of transistor TS becomes predominant for which reason the overall response to temperature exhibits an inflection point at this temperature.

If only resistor R4 of the circuit part is used, this creates a positive response to temperature of the control current and thus of current Iq that is fed into load D1-Dn. If only transistor T1 and resistors R1, R2 and R3 are used, it is possible, especially through resistor R2, to create a positive to neutral response all the way to a strongly negative response to temperature. In combination with resistor R4 it is possible to create responses to temperature with an inflection point, e.g., first positive, then neutral or negative. Using resistors R5 and R6, it is possible to create a strong positive response to temperature. Since the reference voltage is provided by using the sufficiently stable processor voltage of IC (μC) through its output port, this eliminates the need for special additional component parts.

Figure 4:
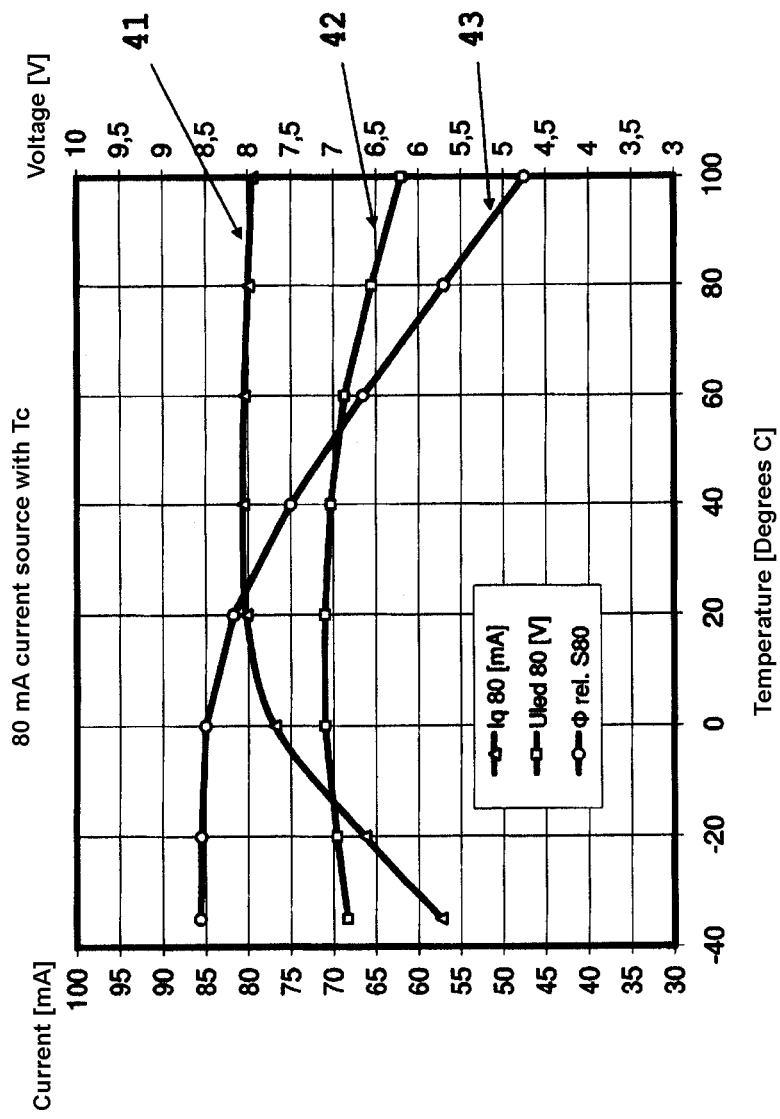
FIG. 4 illustrates a plot of the behavior of the intensity of current from either current source shown in FIGS. 1 and 2 against temperature with a defined temperature inflection point.

Referring now to FIG. 4, with continual reference to FIGS. 1, 2, and 3, a plot of the behavior of the intensity of current from current source 20 against temperature with a defined temperature inflection point is shown. As described, current source 20 has an adjustable temperature coefficient. In the plot shown in FIG. 4, curve 41 represents current Iq, curve 42 represents the LED voltage, and curve 43 represents the luminous efficiency. The temperature inflection point is set at +20° C. Below 20° C., current Iq drops off with a positive temperature coefficient, which has been correspondingly created.

Above 20° C. it is neutral. The LED voltage no longer rises with falling temperatures and the luminous efficiency is limited. The control reserve between supply voltage UB and the voltage drop at load 25 is no longer reduced, which improves the working voltage range of the current source from, e.g., 9.5-18 V to 8-18 V.

Varying supply voltage UB alters the power dissipation of transistor TQ of driver stage 23 and causes an error in current Iq. Through resistor RK of current determining unit 21, a compensation current is driven into resistor RS as a function of supply voltage UB to balance the error in current Iq.

Control source 20 is also capable of pulse-width modulation for brightness controls, e.g., at 200 Hz, preferably by switching reference voltage UC.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

List of Reference Numbers
11 Current source
12 Load
D1 . . . Dn Light-emitting diodes (LEDs)
20 Current source
21 Current determining unit
22 Voltage modification unit
23 Driver stage
24 Reference voltage source
25 Load
R1-R6 Resistors
RE Emitter resistor
RK K resistor
RS S Resistor
TS, T1, TQ Transistors
Iq Current
UB Supply voltage
UC Reference voltage
μC Microcomputer (IC)
UμC Supply voltage of microcomputer (IC)
41 Current Iq curve
42 Voltage curve
43 Luminous efficiency curve

What is claimed is:

1. A method to supply a load with current from a current source, the method comprising:
  generating a reference voltage at an integrated chip;
  tapping by the current source the reference voltage from a port of the integrated chip such that the reference voltage is switchable;
  generating by the current source a control current as a function of the reference voltage;
  feeding by the current source the control current to a driver stage of the current source for the current source to produce a supply current to be supplied from an output of the current source to the load; and
  limiting by the current source the supply current to a predefined maximum and changing by the current source the intensity of the supply current as a function of temperature of the load.

2. The method of claim 1 wherein:
  changing the intensity of the supply current is done through adjustable temperature coefficients of the current source.

3. The method of claim 2 wherein:
the adjustable temperature coefficients are obtained through targeted selection of the components of the current source.

4. The method of claim 1 wherein:
the load includes a diode array having at least two light-emitting diodes.

5. The method of claim 4 wherein:
the light-emitting diodes are connected in series.

6. The method of claim 1 wherein:
the driver stage of the current source includes a first transistor whose collector is the output of the current source and whose emitter is connected to a supply voltage.

7. The method of claim 6 wherein:
the current source further includes a reference voltage source having the integrated chip, a current determining unit, and a voltage modification unit.

8. The method of claim 7 wherein:
the current determining unit includes a second transistor, a fifth resistor, a sixth resistor, an S-resistor (RS), and a K-resistor (RK);
the voltage modification unit includes a third transistor, a first resistor, a second resistor, a third resistor, and a fourth resistor;
wherein the fourth resistor is connected between the collector of the second transistor and the supply voltage;
wherein the control current fed to the driver stage is defined by the second transistor and the fourth resistor.

9. The method of claim 8 wherein:
a positive response by the control current to the temperature of the load depends on values of the fifth and sixth resistors.

10. A current source with adjustable temperature response to drive a load, the current source comprising:
a reference voltage source having an integrated chip with an output port for outputting a reference voltage;
a current determining unit having a second transistor, a fifth resistor, a sixth resistor, an S-resistor (RS), and a K-resistor (RK), wherein the base of the second transistor is connected with the output port of the integrated chip through the fifth resistor for the current determining unit to tap the reference voltage from the output port of the integrated chip;
a voltage modification unit having a third transistor, a first resistor, a second resistor, a third resistor, and a fourth resistor, wherein the collector of the third transistor is connected to a supply voltage through the first resistor, wherein the fourth resistor is connected in parallel to the emitter of the third transistor and the first resistor, wherein the emitter of the third transistor is connected to the collector of the second transistor; and
a driver stage having a first transistor and an emitter resistor, wherein the emitter of the first transistor is connected to the supply voltage through the emitter resistor, wherein the base of the first transistor is connected with the emitter of the third transistor and the second resistor.

11. The current source of claim 10 wherein:
the collector of the first transistor supplies the output current of the current source.

12. The current source of claim 11 wherein:
the second resistor is connected between the collector and the base of the third transistor and the third resistor is connected between the base and the emitter of the third transistor.

13. The current source of claim 12 wherein:
the base of the second transistor is grounded through sixth resistor, and the emitter of the second transistor is grounded through the S-resistor (RS) and is connected to the supply voltage through the K-resistor (RK) which is connected in series to the S-resistor (RS).

14. The current source of claim 13 wherein:
the temperature coefficient of the current source can be adjusted by a selection of at least one of the first, second, and third resistors and the fifth and sixth resistors.

15. The current source of claim 14 wherein:
a positive temperature coefficient depends upon the fifth and sixth resistors.

16. The current source of claim 14 wherein:
a negative temperature coefficient depends upon the second resistor.

17. The current source of claim 10 wherein:
the reference voltage is pulse-width modulated.

18. The current source of claim 17 wherein:
the modulation frequency of the reference voltage is 200 Hz.

19. The current source of claim 10 wherein:
the load includes a diode array having at least two light-emitting diodes.

20. The current source of claim 19 wherein:
the light-emitting diodes are connected in series.

* * * * *